(12) United States Patent
Raffy

(10) Patent No.: US 9,845,266 B2
(45) Date of Patent: Dec. 19, 2017

(54) FUSED GRAINS OF MAGNESIUM-RICH MAGNESIUM ALUMINATE

(71) Applicant: SAINT-GOBAIN CENTRE DE RECHERCHES ET D'ETUDES EUROPEEN, Courbevoie (FR)

(72) Inventor: Stéphane Raffy, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 15/126,913

(22) PCT Filed: Mar. 17, 2015

(86) PCT No.: PCT/FR2015/050642
§ 371 (c)(1),
(2) Date: Sep. 16, 2016

(87) PCT Pub. No.: WO2015/140459
PCT Pub. Date: Sep. 24, 2015

(65) Prior Publication Data
US 2017/0096373 A1  Apr. 6, 2017

(30) Foreign Application Priority Data
Mar. 18, 2014 (FR) .................................... 14 52232

(51) Int. Cl.
| | | |
|---|---|---|
| C04B 35/443 | (2006.01) | |
| C04B 35/053 | (2006.01) | |
| C04B 35/626 | (2006.01) | |
| C04B 35/653 | (2006.01) | |
| C04B 38/00 | (2006.01) | |
| C04B 35/645 | (2006.01) | |

(52) U.S. Cl.
CPC .......... *C04B 35/443* (2013.01); *C04B 35/053* (2013.01); *C04B 35/6261* (2013.01); *C04B 35/62675* (2013.01); *C04B 35/6455* (2013.01); *C04B 35/653* (2013.01); *C04B 38/0074* (2013.01); *C04B 2235/3206* (2013.01); *C04B 2235/3208* (2013.01); *C04B 2235/3217* (2013.01); *C04B 2235/3222* (2013.01); *C04B 2235/3244* (2013.01); *C04B 2235/5436* (2013.01); *C04B 2235/656* (2013.01); *C04B 2235/6567* (2013.01); *C04B 2235/72* (2013.01); *C04B 2235/77* (2013.01); *C04B 2235/80* (2013.01); *C04B 2235/96* (2013.01)

(58) Field of Classification Search
CPC .................................................. C04B 35/443
See application file for complete search history.

(56) References Cited

U.S. PATENT DOCUMENTS

| | | | |
|---|---|---|---|
| 3,993,119 A | 11/1976 | Scott | |
| 5,344,802 A * | 9/1994 | Knauss | ................. C04B 35/443 501/120 |
| 6,723,442 B1 | 4/2004 | Decker et al. | |
| 2010/0151232 A1* | 6/2010 | Cabodi | ................. C03B 5/2375 428/337 |

FOREIGN PATENT DOCUMENTS

| | | |
|---|---|---|
| DE | 102 57 001 A1 | 6/2004 |
| FR | 2 853 898 A1 | 10/2004 |
| WO | WO 01/56948 A1 | 8/2001 |
| WO | WO 2004/030131 A2 | 4/2004 |
| WO | WO 2008/025440 A1 | 3/2008 |

OTHER PUBLICATIONS

International Search Report as issued in International Patent Application No. PCT/FR2015/050642, dated Jun. 30, 2015.
Alper, A. M., et al., "The System MgO—MgAl$_2$O$_4$," Journal of the American Ceramic Society, vol. 45, No. 6, Jun. 2006, pp. 263-268, XP055150527, Retrieved from the Internet: http://onlinelibrary.wiley.com/doi/10.1111/j.1151-2916.1962.tb11141.x/pdf [retrieved on Nov. 3, 2014].
Maryasev, I. G., et al., "Effect of Precursor Raw Materials on the Structure of Fused Alumomagnesian Spinel," Refractories and Industrial Ceramics, vol. 44, No. 6, Nov. 2003, pp. 405-410, XP055150696.

* cited by examiner

*Primary Examiner* — Karl Group
(74) *Attorney, Agent, or Firm* — Pillsbury Winthrop Shaw Pittman LLP

(57) ABSTRACT

A fused grain is essentially composed of a matrix of a magnesium aluminum oxide of spinel structure MgAl$_2$O$_4$ and/or of the MgO—MgAl$_2$O$_4$ eutectic, the matrix including inclusions essentially composed of magnesium oxide, the grain exhibiting the following overall chemical composition, as percentages by weight, expressed in the form of oxides: more than 20.0% and less than 50.0% of Al$_2$O$_3$, Al$_2$O$_3$ and MgO together represent more than 95.0% of the weight of the grain, wherein the cumulative content of CaO and ZrO$_2$ is less than 4000 ppm by weight.

12 Claims, 3 Drawing Sheets

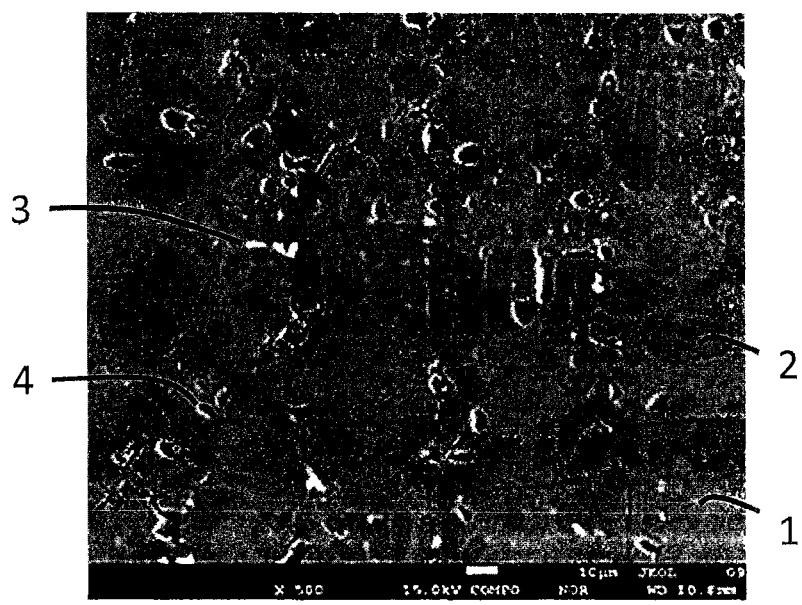
Figure 1a
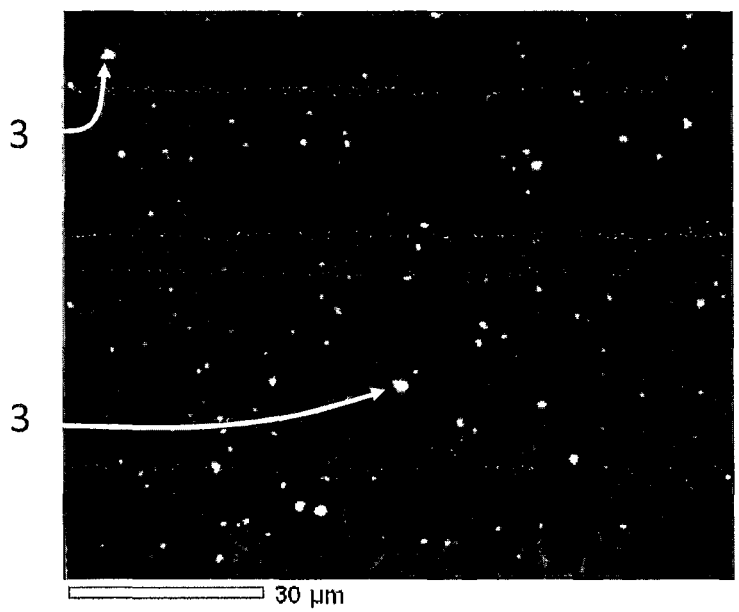
Figure 1b
FIGURE 1

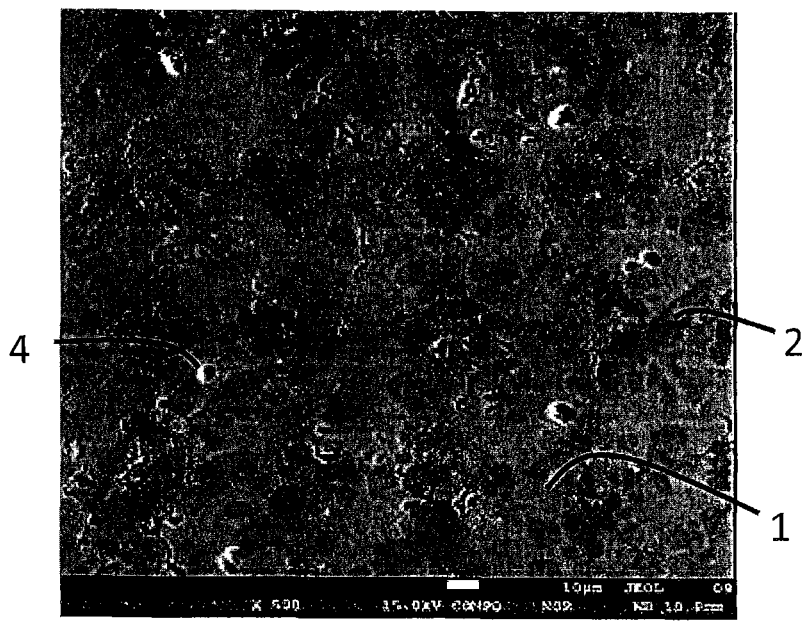
Figure 2a
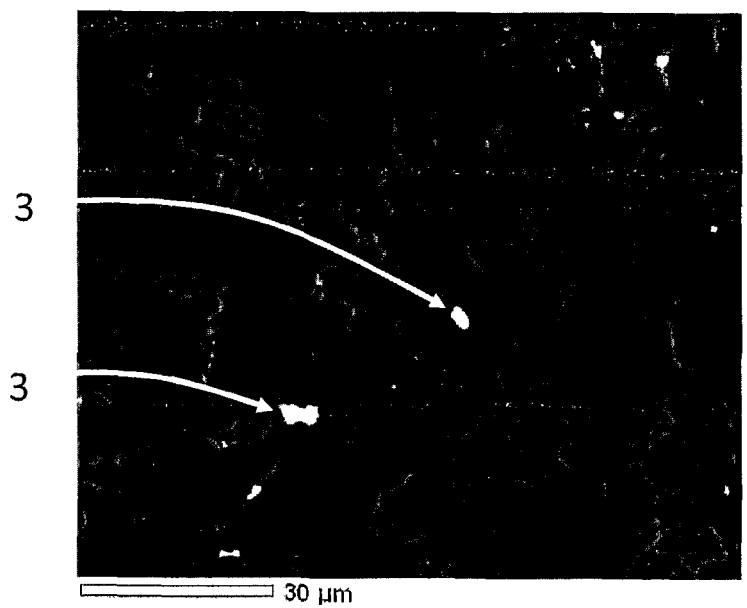
Figure 2b
FIGURE 2 ated Mar. 17, 2015, which in turn claims priority to French
FUSED GRAINS OF MAGNESIUM-RICH MAGNESIUM ALUMINATE

CROSS-REFERENCE TO RELATED APPLICATIONS

This application is the U.S. National Stage of International Application Serial No. PCT/FR2015/050642, filed Mar. 17, 2015, which in turn claims priority to French Application No. 1452232, filed Mar. 18, 2014. The contents of all of these applications are incorporated herein by reference in their entirety.

The invention relates to grains for ceramic applications essentially composed of oxides of the elements Al and Mg in the form of magnesium-rich magnesium aluminate, often known as MMA in the field. The invention also relates to a process for the manufacture of such grains and also to ceramic materials, products or coatings formed from said grains, often known as MMA ceramics. Such materials have an application in particular, but not solely, in the manufacture of SOFC tubes or also in the manufacture of supports for the separation of gases. Such materials can also be used in the preparation of refractory parts for the manufacture or conversion of metals or metal alloys. They can also be used as coating for metal parts or also in the cases of contact between a ceramic part and a metal.

One of the essential characteristics which has made possible the use of MMA ceramics in numerous technical fields is their thermal expansion coefficient (TEC). In particular, studies carried out previously have shown that the thermal expansion coefficient of MMA ceramics was similar or very close to that of metals and that, in addition, the thermal expansion coefficient could be adjusted, as a function of the chemical composition of the ceramic material and of its microstructure, to correspond precisely to that of the metal with which it is in contact. Reference may be made, on this subject, for example, to the patent application WO 2004/030131 or to the U.S. Pat. No. 6,723,442 B1.

Another characteristic of MMA ceramics for use at high temperature is their dimensional stability and in particular their creep strength. Creep is understood to mean, within the meaning of the present invention, the ability of the material to deform under the effect of the stresses experienced when it is subjected to high temperatures. However, studies carried out by the applicant company have revealed, as will be demonstrated in the continuation of the description, that the MMA ceramics as described above, in particular according to the abovementioned U.S. Pat. No. 6,723,442 B1, exhibited a relatively low creep strength, in particular for applications such as the manufacture of supports for the separation of gases.

Thus, the present invention relates to fused grains of MMA type which can be used in the manufacture of ceramic parts or coatings, the creep strength of which is substantially improved with respect to the current state of the art.

Surprisingly, studies carried out by the applicant company have thus been able to demonstrate a connection between the content of certain impurities of the grains and the final performance of the creep strength of the ceramic material obtained from these grains.

More specifically, the present invention relates to a fused grain (or to a mixture of fused grains) essentially composed of a matrix of a magnesium aluminum oxide of spinel structure $MgAl_2O_4$ and/or of the $MgO$—$MgAl_2O_4$ eutectic, said matrix comprising inclusions essentially composed of magnesium oxide, said grain exhibiting the following overall chemical composition, as percentages by weight, expressed in the form of oxides:
more than 20.0% and less than 50.0% of $Al_2O_3$,
$Al_2O_3$ and MgO together represent more than 95.0% of the weight of said grain,
said grain being characterized in that the cumulative content of CaO and of $ZrO_2$ is less than 4000 ppm by weight.

The grain according to the invention can comprise, in particular in the form of impurities, up to 5% of other oxides.

Preferably, the cumulative content of CaO and of $ZrO_2$ is less than 3500 ppm, more preferably less than 3000 ppm and very preferably less than 2500 ppm by weight. Cumulative content is understood to mean the sum of the contents of CaO and of $ZrO_2$ in the fused grains.

Preferably, the content of CaO is less than 3500 ppm, more preferably less than 3000 ppm, indeed even less than 2500 ppm, indeed even less than 2000 ppm and very preferably less than 1500 ppm by weight.

Preferably, the content of $ZrO_2$ is less than 3000 ppm, more preferably less than 2000 ppm, indeed even less than 1500 ppm, indeed even less than 1000 ppm, indeed even less than 500 ppm and very preferably less than 200 ppm by weight.

Preferably, the fused grain according to the invention does not comprise an alumina $Al_2O_3$ structural phase.

Preferably, the cumulative content of BaO and of SrO is less than 3000 ppm, more preferably less than 2500 ppm and very preferably less than 2000 ppm by weight. Cumulative content is understood to mean the sum of the contents of BaO and of SrO in the fused grains.

Preferably, the content of BaO is less than 2500 ppm, more preferably less than 2000 ppm, indeed even less than 1500 ppm and indeed even less than 1000 ppm by weight.

Preferably, the content of SrO is less than 2500 ppm, more preferably less than 2000 ppm, indeed even less than 1500 ppm and indeed even less than 1000 ppm by weight.

Preferably, the content of $Na_2O$ is less than 1000 ppm, more preferably less than 500 ppm and indeed even less than 300 ppm.

Preferably, the content of $Fe_2O_3$ is less than 1000 ppm, more preferably less than 750 ppm and indeed even less than 500 ppm by weight.

Preferably, the content of $MnO_2$ is less than 500 ppm, more preferably less than 300 ppm, indeed even less than 200 ppm and indeed even less than 100 ppm by weight.

Preferably, the content of $SiO_2$ is less than 500 ppm and more preferably less than 200 ppm by weight.

Preferably, the content of $TiO_2$ is less than 500 ppm by weight.

According to an embodiment, $Al_2O_3$ represents more than 25.0% of the weight, indeed even more than 30.0% and indeed even more than 35.0% of the weight of said grain. $Al_2O_3$ can represent less than 45.0% of the weight of said grain.

Preferably, $Al_2O_3$ and MgO together represent more than 96.0% of the weight of said grain. Preferably again, $Al_2O_3$ and MgO together represent more than 97.0%, indeed even more than 98.0%, indeed even more than 99.0%, or even more than 99.2% and very preferably at least 99.4% of the weight of said grain.

Preferably, the matrix of the fused grain according to the invention is composed of separate regions of spinel structure and of the $MgO$—$MgAl_2O_4$ eutectic.

The fused grain according to the invention comprises fine inclusions essentially composed of calcium and zirconium oxides, the greatest dimension of which is less than 2 micrometers, preferably less than 1 micrometer, on an electron microscopy photograph.

"Essentially composed" is understood to mean that the cumulative sum of said calcium and zirconium oxides represents more than 80% (by weight) of said inclusions and preferably more than 90%, indeed even more than 95% (by weight), of said inclusions. This percentage by weight is, for example, measured by EPMA as indicated in the continuation of the description.

The present invention also relates to the ceramic material obtained by sintering fused grains as described above, for example in the form of a ceramic part or of a ceramic coating.

Such a material is characterized in particular in that it can comprise fine inclusions essentially composed of calcium and zirconium oxides, the number of which is less than 100 per 10 000 square micrometers, on an electron microscopy photograph.

BRIEF DESCRIPTION OF THE DRAWINGS

FIGS. 1a and 1b respectively correspond to the microstructure of a fused grain and to that of the material of the sintered ceramic part according to a comparative example;

FIGS. 2a and 2b respectively correspond to the microstructure of a fused grain and to that of the material of the sintered ceramic part of an example according to an embodiment of the invention;

FIG. 3 is a magnification of the photograph given in FIG. 2a, and

Figure 3:

Within the meaning of the present invention, the following definitions and indications are given:

In accordance with the practices in the field of ceramics, the chemical composition of the grains, in particular according to the main constituent elements Al and Mg, is given in the present description, unless explicitly mentioned otherwise, with reference to the corresponding simple oxides $Al_2O_3$ or MgO, even if said element is not present or is present only partially in this form. It is the same for the impurities present in the grains, the content of which is given with reference to the oxide of the corresponding element, even if said element is actually present in another form in said grains. In addition, such a description is in accordance with the data usually supplied by the elemental chemical analysis according to the X-ray fluorescence devices ordinarily used to determine the elemental composition of the materials.

"MgO—$MgAl_2O_4$ eutectic" is understood to mean the eutectic structure corresponding to the point with the composition, by weight, in the vicinity of 55% of $Al_2O_3$ and 45% of MgO and with the temperature in the vicinity of 2000° C. in the MgO—$Al_2O_3$ phase diagram (invariant point of the phase diagram for which the liquid to solid reaction is complete).

"Fused grain" conventionally refers to a grain obtained by a manufacturing process comprising at least a stage of melting an initial mixture of starting materials, a stage of solidification and a stage of grinding.

"Melting" an initial mixture of starting materials refers to a heat treatment at a temperature sufficiently high for all the constituents of the initial mixture to occur in the molten (liquid) state.

"Impurities" is understood to mean in particular the unavoidable constituents necessarily introduced with the starting materials. The impurities are introduced by the starting materials during the preliminary stage of manufacture of the fused grains.

The main impurities depend, of course, on the starting materials used, generally commercial MgO or $Al_2O_3$ powders with a purity greater than or equal to 95% by weight of the oxide. The main impurities detectable in the grain or the material according to the invention are generally and essentially calcium, iron, silicon, manganese, sodium, zirconium or also titanium oxides.

The chemical analysis of the material obtained by sintering fused grains according to the invention is essentially identical to that of said fused grains. Thus, the different elements constituting the microstructure of the material obtained by sintering fused grains according to the invention are substantially identical to those of said fused grains.

"Sintering" refers conventionally, in the field of ceramics, to a consolidation by heat treatment of a granular agglomerate, optionally with partial or complete melting of some of the constituents of said agglomerate but without melting of at least one of its constituents.

The sintering according to the invention is normally carried out in the exclusively solid phase and in particular all of the constituents of the fused grains remain in the solid phase during said sintering.

According to the invention, the sintering temperature of the fused grains is normally between 1200° C. and 1650° C. A process for the manufacture of the grains which are described above comprises the following stages:
  a) mixing the starting materials in order to form the starting charge;
  b) melting the starting charge until the molten liquid is obtained;
  c) cooling said molten liquid so that the molten liquid is completely solidified, for example in less than 3 minutes;
  d) grinding said solid mass so as to obtain a mixture of fused grains.

According to the invention, the starting materials are chosen in stage a) so that the fused grains obtained in stage d) are in accordance with the invention.

Of course, without departing from the scope of the invention, any other conventional or known process for the manufacture of fused grains can also be carried out, provided that the composition of the starting charge makes it possible to obtain grains exhibiting a composition in accordance with that of the grains of the invention.

In stage b), use is preferably made of an electric arc furnace but all known furnaces can be envisaged, such as an induction furnace or a plasma furnace, provided that they make it possible to completely melt the starting charge. Melting is preferably carried out under neutral conditions, for example under argon, or oxidizing conditions, preferably at atmospheric pressure.

In stage c), the cooling can be rapid, that is to say that the molten liquid is completely solidified in less than 3 minutes. Preferably, it results from casting in CS molds, such as described in the patent U.S. Pat. No. 3,993,119, or from quenching or also by a blowing technique.

In stage d), the solid mass is ground, according to conventional techniques, until the size of the grains suitable for the envisaged application is obtained. For example, the grinding can be continued until grains of micrometric size, for example of the order of 0.1 to 50 microns in some applications or of 20 to 150 microns in other applications (for example thermal spraying) or even up to 5 millimeters, for applications such as the manufacture of refractory materials, are obtained.

A better understanding of the invention and its advantages will be obtained on reading the nonlimiting examples which follow. In the examples, unless otherwise indicated, all the percentages and also the ppm (parts by million) values are given by weight.

EXAMPLE 1 (IN ACCORDANCE WITH THE TEACHING OF U.S. PAT. NO. 6,723,442 B1)

In this comparative example, fused grains are prepared by melting starting from the following usual starting materials:

a magnesium oxide ($MgO \geq 98.2\%$ by weight) powder exhibiting the following impurities (percentage by weight): $Al_2O_3$: 0.1%, CaO: 0.8%, $Fe_2O_3$: 0.4%, $SiO_2$: 0.2%, $ZrO_2$: 0.1%, $MnO_2$: 0.1%;

an aluminum oxide ($Al_2O_3 \geq 99\%$) powder exhibiting the following impurities (as percentage by weight): $Na_2O$: 0.23%, CaO<0.02%, MgO<0.05%, $Fe_2O_3$<0.02%, $SiO_2$<0.05%, $ZrO_2$<0.02%, $TiO_2$<0.02%.

The initial mixture is formed solely from these two commercial powders mixed in a $MgO/Al_2O_3$ ratio by weight of the order of 60/40.

The powder mixture is melted in an arc furnace at a temperature of the order of 2100 to 2300° C. The molten liquid is solidified and cooled. The fused product is subsequently ground until a powder formed of fused grains is obtained, the median size $d_{50}$ of the particles of which, as measured by laser particle sizing, is of the order of 5.4 micrometers.

The elemental analysis by X-ray fluorescence of the fused grains thus obtained makes it possible to determine, with a relative uncertainty of the order of 1%, the concentrations of $Al_2O_3$ and MgO oxides. The values thus measured are given in table 1 below. The elemental analysis by ICP (Inductively Coupled Plasma) of the fused grains obtained makes it possible to determine, with an uncertainty of less than 50 ppm, the concentrations of the other oxides which are given in table 1 below. The grains exhibit a content of aluminum oxide of 41.5 percent by weight and a content of magnesium oxide of 57.4 percent by weight. The impurities detected are calcium (4100 ppm of CaO equivalent), iron (3200 ppm of $Fe_2O_3$ equivalent), silicon (900 ppm of $SiO_2$ equivalent), manganese (670 ppm of $MnO_2$ equivalent), zirconium (600 ppm of $ZrO_2$ equivalent) and titanium (125 ppm of $TiO_2$ equivalent).

The porosity and the creep strength with regard to a ceramic part obtained from such grains is subsequently measured.

The powder formed of fused grains is first shaped by pressing into the form of a small bar having dimensions:

4.7 mm×22.5 mm×111.5 mm.

The part thus obtained is subsequently sintered at 1350° C. for 4 hours.

The porosity and the creep strength of the ceramic part thus prepared are measured according to the following protocols:

Bulk density: ratio equal to the weight of the sample divided by the volume which said sample occupies.

Absolute density: ratio equal to the weight of dry matter of the sample after grinding the sample to a fineness such that substantially no porosity remains, divided by the volume of the powder thus obtained after grinding. It is measured by helium pycnometry after said grinding.

Relative density: ratio equal to the bulk density divided by the absolute density, expressed as a percentage.

Porosity: The porosity, expressed as a percentage, is calculated by subtracting the relative density from 100.

Creep: The creep is measured by placing the sample (with dimensions of 4 mm×20 mm×102 mm) in four support points configuration (distance between external supports L=80.5 mm, distance between internal supports l=40 mm). The sample is subsequently brought to a temperature of 1100° C. The temperature is kept constant and the sample is subjected to a stress of 12.5 MPa at its middle. The variation in the deflection on the sample is recorded throughout the test. Df90 and Df100, the relative strain, given respectively after 90 hours or 100 hours, are noted. A creep rate $V100=(Df100-Df90)/36\,000$, expressed in $s^{-1}$, is subsequently calculated.

The results obtained are given in table 1 below.

EXAMPLE 2 (ACCORDING TO THE INVENTION)

In this comparative example, fused grains are prepared by melting starting from the following usual starting materials:

a magnesium oxide powder exhibiting a chemical analysis (as percentages by weight) with $MgO \geq 99\%$; $CaO \leq 0.1\%$; $Na_2O \leq 0.1\%$; $SiO_2 \leq 0.05\%$; $ZrO_2 \leq 0.02\%$; $Fe_2O_3 \leq 0.02\%$;

the same aluminum oxide powder as that used for example 1.

The magnesium oxide powder used in this example differs from that used in example 1 in its lower content of impurities.

The initial mixture is composed solely of these two commercial powders, mixed in the same ratio as for the preceding example.

The mixture is subjected to the same melting/solidification/grinding process as described in example 1.

The chemical analysis is determined according to the same techniques as for example 1 and is given in table 1 below. The grains exhibit a content of aluminum oxide of the order of 41.5 percent by weight and a content of magnesium oxide of the order of 57.9 percent by weight. The impurities detected are calcium (1091 ppm of CaO equivalent), iron (483 ppm of $Fe_2O_3$ equivalent), silicon (174 ppm of $SiO_2$ equivalent), zirconium (less than 50 ppm of $ZrO_2$ equivalent), titanium (320 ppm of $TiO_2$ equivalent) and sodium (286 ppm of $Na_2O$ equivalent).

A sintered ceramic part having the same dimensions and a similar porosity to those described in example 1 is prepared from the grains in a similar way to that described in example 1, by sintering at 1550° C.

Finally, the porosity and the creep strength of the sintered ceramic part thus prepared are measured according to the same protocols as described above.

The results obtained are given in table 1 below.

TABLE 1

| | Fused grains | | | | | | | | |
|---|---|---|---|---|---|---|---|---|---|
| | Content | | | | | | | | |
| | $Al_2O_3$ (%) | MgO | CaO | $ZrO_2$ | $Fe_2O_3$ | $TiO_2$ (ppm) | $SiO_2$ | $Na_2O$ | $MnO_2$ |
| Example 1 | 41.5 | 57.4 | 4100 | 600 | 3200 | 125 | 900 | <50 | 670 |
| Example 2 | 41.5 | 57.9 | 1091 | <50 | 483 | 320 | 174 | 286 | <50 |

| | Sintered ceramic part | | |
|---|---|---|---|
| | Property | | |
| | Porosity (%) | Creep strength ($s^{-1}$) | Number of regions rich in CaO and $ZrO_2$ per 10 000 micrometers$^2$ |
| Example 1 | 22.1 | $2 \times 10^{-9}$ | 208 |
| Example 2 | 23.4 | $0.7 \times 10^{-9}$ | 12 |

The results given in the preceding table 1 show a connection between the content of impurities and the creep strength properties of the material: the creep strength properties are improved if the content of CaO and $ZrO_2$ is minimized in the fused grains and the sintered ceramic part obtained from these grains.

The microstructure of the fused grains and of the sintered materials constituting the ceramic parts according to examples 1 and 2 was analyzed by SEM electron microscopy. The photographs are given in FIGS. 1 and 2, corresponding to different photographs of the microstructure respectively according to examples 1 and 2. More specifically:

FIGS. 1a and 1b respectively correspond to the microstructure of a fused grain and to that of the material of the sintered ceramic part according to comparative example 1, FIGS. 2a and 2b respectively correspond to the microstructure of a fused grain and to that of the material of the sintered ceramic part of example 2 according to the invention.

Figure 4:
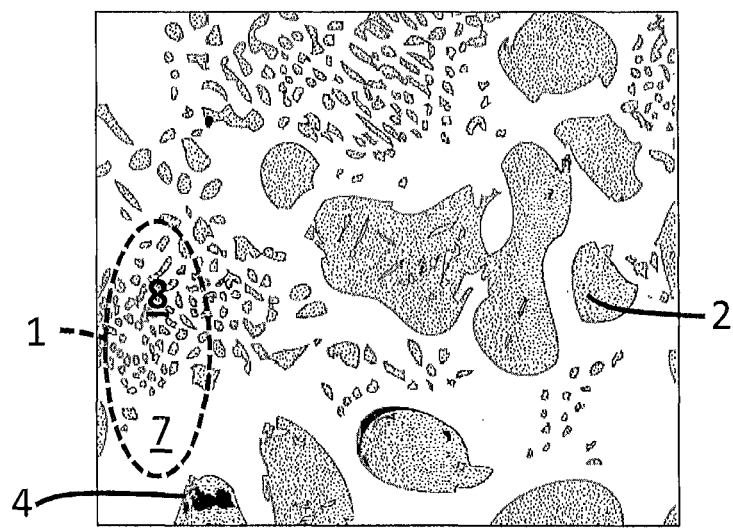
FIG. 4 is a diagram that shows the main elements of FIG. 3.

FIG. 3 is a magnification of the photograph given in FIG. 2a, the width of FIG. 3 representing 40 microns. For greater clarity, the main elements visible in FIG. 3 have been taken up again diagrammatically in FIG. 4.

The grains/materials according to examples 1 and 2 each exhibit a matrix phase 1 in which broad inclusions 2 (in darker gray in the figures) are observed. Pores 4 also appear in the two grains/materials (in black in the figures). The presence of finer inclusions 3 (in white in the figures) is also detected in the two grains/materials according to examples 1 and 2.

Furthermore, according to an X-ray diffraction analysis, the fused grains and the sintered part of example 2 do not exhibit an alumina $Al_2O_3$ phase.

The visual comparison of FIGS. 1b and 2b shows that these fine inclusions 3 are much more restricted in number for the material according to the invention, as given in table 1 above.

The visual comparison of FIGS. 1b and 2b also shows that these fine inclusions 3 appear very different in nature between the two photographs: they are relatively rare and concentrated in the photographs according to example 2 and in greater number, of smaller size and relatively dispersed in the photographs according to example 1.

In FIG. 3 (magnification of FIG. 2a), it may be observed that the matrix phase is not unique and uniform: it comprises structurally homogeneous regions 7 and heterogeneous regions 8 in which a fine dispersion of crystals in the matrix phase is observed.

The analysis of the various regions by wavelength spectrometry (electron probe microanalyzer, EPMA) made it possible to confirm the visual observations and to specify the compositions of the various phases and inclusions observed in the electron microscopy photographs of FIGS. 1 and 2:
  the matrix phase 1 is not uniform and is composed of two very distinct regions 7 and 8:
    the homogeneous region 7 is composed of approximately 72 percent of $Al_2O_3$ and 28 percent of MgO, and thus corresponds to a pure or substantially pure spinel $MgAl_2O_4$ phase,
    the homogeneous region 8 is composed, on average, of approximately 58 percent of $Al_2O_3$ and 42 percent of MgO, and thus corresponds to the MgO—$MgAl_2O_4$ eutectic within the meaning described above,
  the broad inclusions 2 (in dark gray in the figures) are composed very essentially, indeed even exclusively, of MgO,
  the fine inclusions 3 (in white in the figures) are composed very essentially, indeed even exclusively, of calcium and zirconium oxides. The EPMA measurements show in particular that the inclusions are composed of more than 90% (by weight) of calcium and zirconium oxides.

As indicated above, the microstructures of the materials according to example 1 (comparative) and example 2 (according to the invention) differ essentially in the concentration of the inclusions composed mainly of the impurities formed of Ca and Zr oxides. The comparison of the data given in table 1 above makes it possible to establish a direct connection of causality between this structural difference and the improved properties, in particular of creep strength, of the material obtained from the fused grains according to the invention.

The invention claimed is:

1. A fused grain essentially composed of a matrix of a magnesium aluminum oxide of spinel structure $MgAl_2O_4$ and/or of the MgO—$MgAl_2O_4$ eutectic, said matrix comprising inclusions essentially composed of magnesium oxide, said grain exhibiting the following chemical composition, as percentages by weight, expressed in the form of oxides:

more than 20.0% and less than 50.0% of $Al_2O_3$,
$Al_2O_3$ and MgO together represent more than 95.0% of the weight of said grain, wherein a cumulative content of CaO and $ZrO_2$ is less than 4000 ppm by weight, and wherein the matrix is composed of separate regions of spinel structure and of the MgO—$MgAl_2O_4$ eutectic.

2. The fused grain as claimed in claim 1, wherein the cumulative content of CaO and $ZrO_2$ is less than 3000 ppm.

3. The fused grain as claimed in claim 1, wherein the cumulative content of CaO and $ZrO_2$ is less than 2500 ppm.

4. The fused grain as claimed in claim 1, wherein the fused grain does not comprise an alumina $Al_2O_3$ phase.

5. The fused grain as claimed in claim 1, wherein impurities in the fused grain are essentially CaO, $ZrO_2$, $Fe_2O_3$, $SiO_2$, $Na_2O$ and $MnO_2$.

6. The fused grain as claimed in claim 1, comprising less than 2000 ppm of CaO.

7. The fused grain as claimed in claim 1, comprising less than 200 ppm of $ZrO_2$.

8. The fused grain as claimed in claim 1, wherein $Al_2O_3$ and MgO together represent more than 99.0% of the weight of said grain.

9. The fused grain as claimed in claim 1, comprising fine inclusions essentially composed of calcium and zirconium oxides, the greatest dimension of which is less than 2 micrometers.

10. A ceramic material obtained by sintering fused grains as claimed in claim 1.

11. The ceramic material as claimed in claim 10, comprising fine inclusions essentially composed of calcium and zirconium oxides, the number of which is less than 100 per 10 000 square micrometers, on an electron microscopy photograph.

12. The fused grain as claimed in claim 9, where the greatest dimension of the fine inclusions is less than 1 micrometer.

* * * * *